(12) United States Patent
Luderich et al.

(10) Patent No.: US 9,851,584 B2
(45) Date of Patent: Dec. 26, 2017

(54) METHOD OF MAKING AN EYEGLASS LENS

(71) Applicant: Technische Hochschule Köln, Köln (DE)

(72) Inventors: Joerg Luderich, Cologne (DE); David Frings, Duisburg (DE); Christian Poepperl, Solingen (DE)

(73) Assignee: TECHNISCHE HOCHSCHULE KOELN, Cologne (DE)

( * ) Notice: Subject to any disclaimer, the term of this patent is extended or adjusted under 35 U.S.C. 154(b) by 0 days.

(21) Appl. No.: 15/036,078

(22) PCT Filed: Nov. 21, 2014

(86) PCT No.: PCT/EP2014/003115
§ 371 (c)(1),
(2) Date: May 12, 2016

(87) PCT Pub. No.: WO2015/104035
PCT Pub. Date: Jul. 16, 2015

(65) Prior Publication Data
US 2016/0306187 A1    Oct. 20, 2016

(30) Foreign Application Priority Data
Jan. 10, 2014 (DE) .................. 10 2014 000 107

(51) Int. Cl.
*G02C 7/02* (2006.01)
*G02C 1/00* (2006.01)
*G02C 5/02* (2006.01)
*G02C 5/12* (2006.01)
*B29D 11/00* (2006.01)

(52) U.S. Cl.
CPC .......... *G02C 1/10* (2013.01); *B29D 11/00432* (2013.01); *G02C 5/02* (2013.01); *G02C 5/12* (2013.01)

(58) Field of Classification Search
CPC ... G02C 1/10; G02C 5/12; G02C 5/02; B29D 11/00432
USPC .............................................. 351/159.01, 41
See application file for complete search history.

(56) References Cited

U.S. PATENT DOCUMENTS

| 4,921,341 A | 5/1990 | Ace |
| 5,007,977 A * | 4/1991 | Gottschald .......... B29C 63/0026 |
| | | 156/252 |
| 5,502,516 A | 3/1996 | Elterman |

(Continued)

FOREIGN PATENT DOCUMENTS

| DE | 2528967 A1 | 12/1976 |
| DE | 10050007 A | 5/2002 |
| WO | WO 9524669 A1 * | 9/1995 ............... G02C 7/10 |

(Continued)

*Primary Examiner* — Tuyen Tra
(74) *Attorney, Agent, or Firm* — Andrew Wilford

(57) ABSTRACT

The invention relates to a spectacle lens (3) which comprises at least one structural element (SE) on the outer edge (4) and/or the front or rear surface thereof, wherein the at least one structural element (SE) is formed by a material which is applied in liquid form on the edge (3) and/or the front/rear surface of the spectacle lens (4), is connected in a bonded manner to the lens and is hardened chemically or by radiation. The invention further relates to a method for the production thereof.

6 Claims, 5 Drawing Sheets

(56) References Cited

U.S. PATENT DOCUMENTS

2015/0061166 A1    3/2015  VanDeVrie

FOREIGN PATENT DOCUMENTS

| WO | 2002031584 A | 4/2002 | | |
| WO | WO 2013149891 A1 | * | 10/2013 | ......... B29C 67/0059 |

* cited by examiner

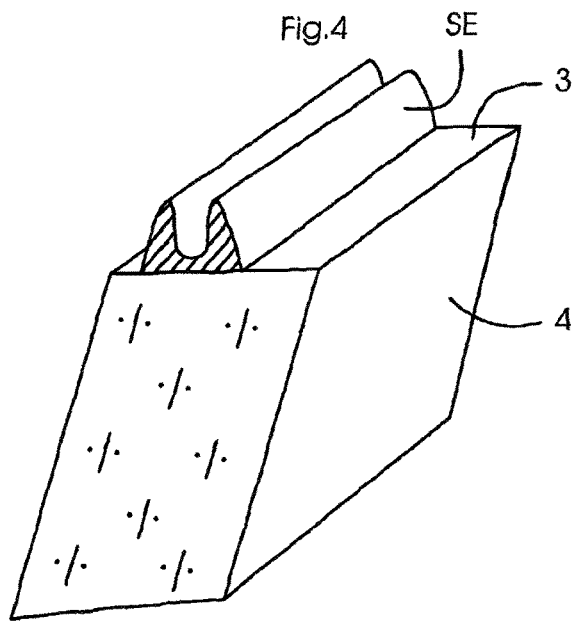
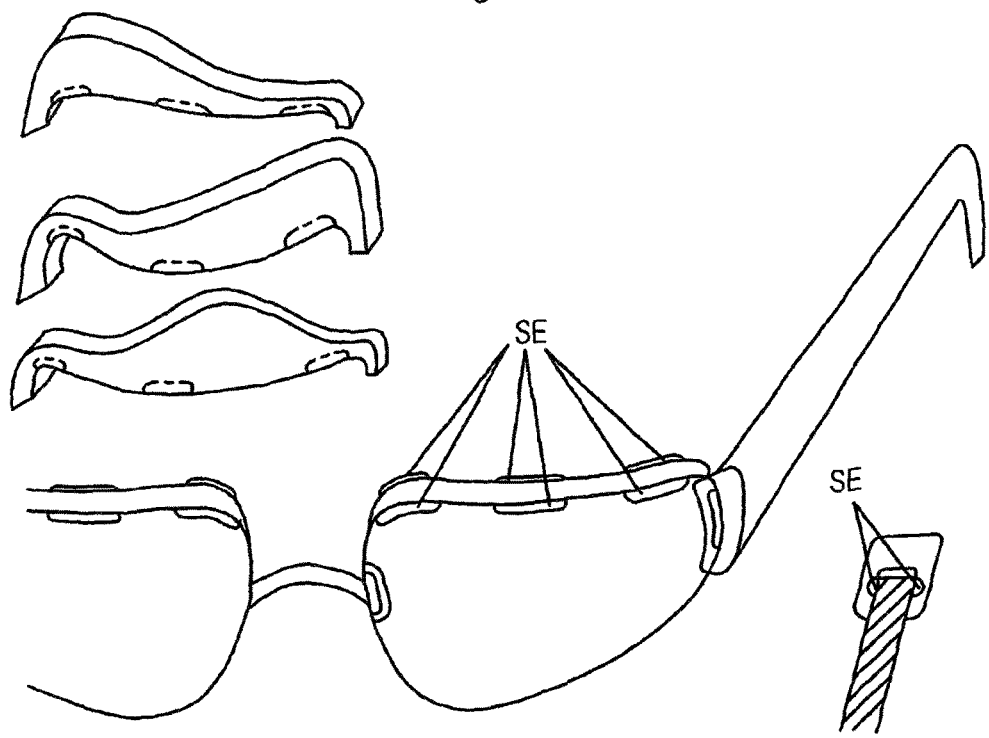

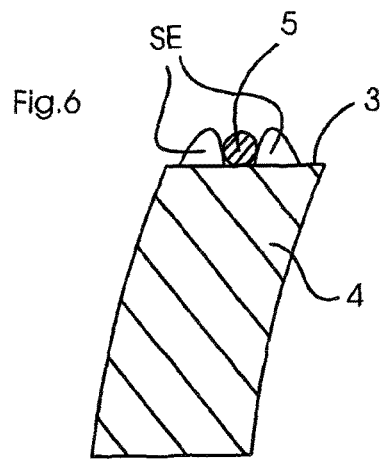
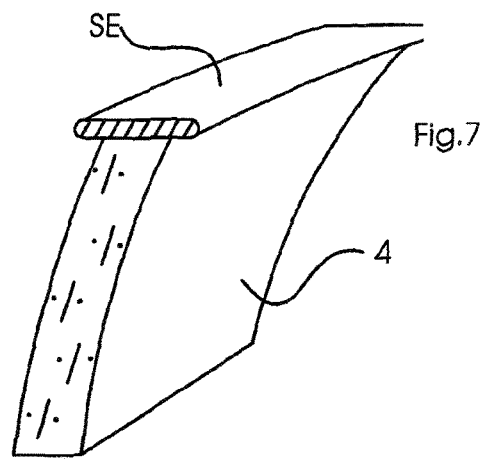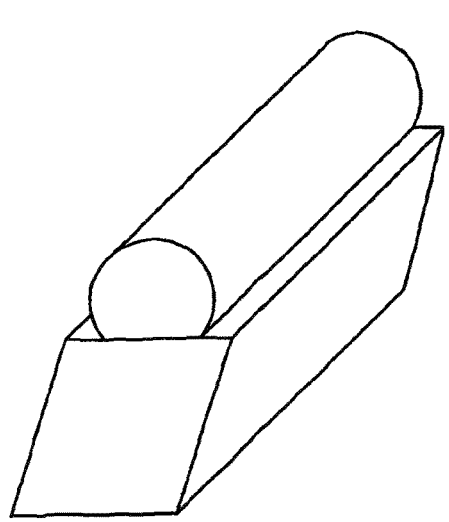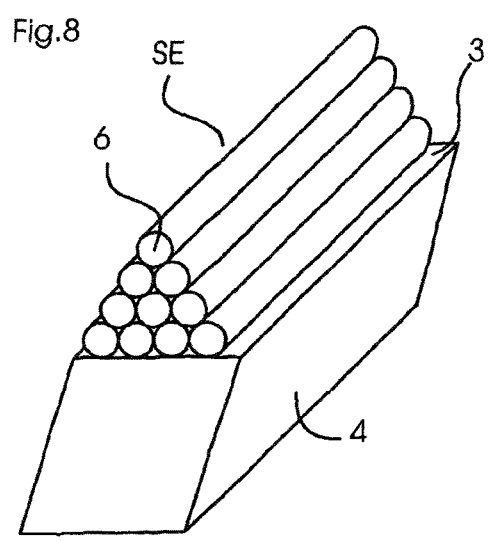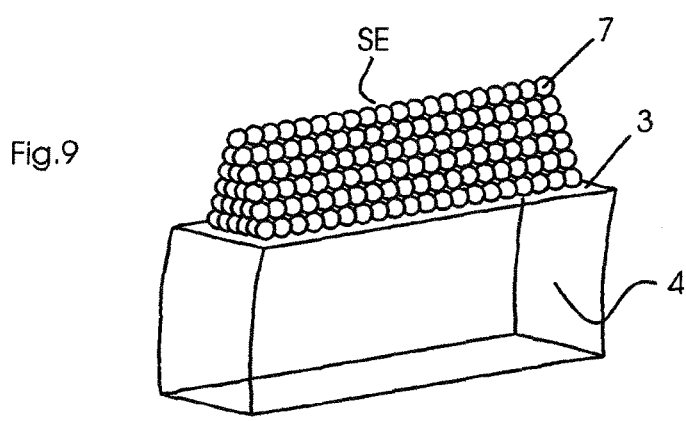

METHOD OF MAKING AN EYEGLASS LENS

CROSS REFERENCE TO RELATED APPLICATIONS

This application is the US-national stage of PCT application PCT/EP2014/003115 filed 21 Nov. 2014 and claiming the priority of German patent application 102014000107.5 itself filed 10 Jan. 2014.

BACKGROUND OF THE INVENTION

The invention relates to an eyeglass lens, in particular one having a cross-section perpendicular to the optical axis that corresponds to an eyeglass lens opening in a selected eyeglass frame or, in the case of rimless or partially framed eyeglasses, to a selected shape, and having at least one structural element applied to the eyeglass lens, preferably on outer and/or front or rear face. The invention relates to a method of making such an eyeglass lens.

Such a structural element can, for example, connect the eyeglass lens and the eyeglass frame according to the known prior art.

Moreover, at least in the case of eyeglasses that are customized for the eyeglass wearer by an optician, the eyeglass lens is centered with respect to the optical axis of the eyeglass wearer's eye by such a structural element and the positioning thereof at/on the eyeglass lens. At least in such a case a structural element also has the function of a centering structural element.

The structural element can be constructed so that it engages in a faceted groove of an eyeglass frame and/or receives the filament of a Nylor frame or produces a clippable connection to the frame.

U.S. Pat. No. 4,921,341 describes an eyeglass lens with a deformable profiled ring glued onto the edge or with an inner undercut that engages in a circumferential groove in the edge of the eyeglass lens.

A method and a device for application of a profiled strip to the contour-machined edge of a rotating eyeglass lens is described in DE 39 08 095 [U.S. Pat. No. 5,007,977]. In this case the profiled strip is laid around the entire circumference of the eyeglass lens, following the three-dimensional curve of the lens edge. For this purpose the profiled start of a continuous strip is joined to the lens edge, a transverse perforation is made in the strip at a distance from the start of the profiled strip that corresponds to the circumference of the lens, the lens is rotated and the profiled strip section is stopped downstream of the perforation in the direction of movement of the profiled strip so that the perforation point severs, after which the new leading end of the strip formed thereby for the next lens that is not yet connected to the lens edge of the first eyeglass lens is pressed against the edge of the next eyeglass lens and connected thereto. In this case the profiled strip is glued on, welded on or lasered on.

In patent document DE 100 50 007 a method is described for positioning a profiled strip on the edge of an eyeglass lens that fixes the position of the profiled strip under CNC control according to a predetermined contour. The fastening on the eyeglass lens takes place then by activation or curing of a glue between the profiled ring and the eyeglass lens.

The methods described in these publications are based on the fundamental idea that the facets hitherto ground out of the basic lens material on eyeglass lens grinding machines can be replaced by a circumferential profiled strand or a profiled strip.

Although in CNC-controlled eyeglass lens edge-grinding machines it is possible for the facet contour of a facet to be ground conform to the contour of the faceted groove of a selected eyeglass frame, the eyeglass lens with the ground facets is completely inelastic, so that stresses from the eyeglass frame are transmitted to the eyeglass lenses during installation.

Due to temperature changes stresses can also be produced that in particular plastic lenses are sensitive to and that tend to cause cracks. An applied profiled strand could consist of an elastic material and thus enable a substantially better adaptation to the frame shape.

Furthermore, the manufacturing process would be substantially simplified and would allow the use of alternative manufacturing processes, such as for example laser cutting, since a two-dimensional manufacturing process is sufficient in order to produce an edge shape that is flat or only slightly curved in the direction of the optical axis.

Furthermore, the grinding of a facet represents an additional operation that in particular considerably prolongs the automated edge machining because of the necessary precision.

The methods and concepts shown in the cited publications have not been successful hitherto on the market, in spite of the advantages by comparison with the prior art. This is cause inter alia by the following points:

- The handling of separate profiled strips and bonding adhesives is difficult in practice and significantly increases the complexity of the machines.
- The shape of the glued or extruded profiled strands cannot be easily adapted to different geometries of the frame groove.
- Eyeglass lenses can have very thin edge regions locally, the application of a profiled strand in these regions is difficult, and projection of the profiled section over the edge of the eyeglass lens is not accepted.
- The long-term durability and load-bearing capacity of compositions with contact adhesives, such as used in profiled strips, is critical taking into account the environmental influences (sunlight, sweat).

OBJECT OF THE INVENTION

The object of the invention is to provide eyeglass lenses with structural elements, in particular centering structural elements, as well as a method of production in which the shape (in particular the cross-section perpendicular to the circumferential direction) and positioning of a structural element on the edge surface of the eyeglass lens and/or of the front and/or rear face thereof can be freely defined.

A further object is to overcome the above-mentioned restrictive points and to make it possible, on the one hand, to glaze the currently known types of eyeglass frame quickly and simply and, on the other hand, to configure new eyeglass frame designs.

A further object of the invention is to be able to fasten any type of structural element to an eyeglass lens in a simple manner in order to achieve specific desired functional effects or even only to produce desired designs.

SUMMARY OF THE INVENTION

These objects are achieved by an eyeglass lens in which the at least one structural element is formed by a material that is applied to the edge and/or the front/rear face of the eyeglass lens in liquid form, is bonded to the lens, and is hardened chemically or by radiation.

These objects are also achieved by a method of production in which a material is applied as a liquid to an eyeglass lens, preferably to the edge surface and/or the front and/or rear face, and bonds with the lens and is hardened by chemical reaction or by irradiation with electromagnetic waves, in particular UV light.

Here the invention can provide that the at least one structural element is formed exclusively only by this material after hardening thereof.

In particular, in the context of the invention an eyeglass lens is understood to be an individual lens, preferably one that is not (yet) inserted into a frame or a holder or parts thereof and that already in this state has the at least one structural element. Thus an eyeglass lens may preferably be a rimless/frameless eyeglass lens that, in particular apart from at least one structural element that is preferred according to the invention, consists merely of the material from which the eyeglass lens is manufactured, that is to say in particular glass or plastic.

Within the context of the invention such a structural element is understood to be such an element that—in particular even if it is intended to produce a connection to a frame—is already provided and exists solely on the unframed eyeglass lens, and in particular is self-supporting after hardening, or even beforehand.

A significant core idea of the invention is that a structural element is formed by a material that is initially liquid and after application to the eyeglass lens is hardened in a controlled manner by chemical reaction or irradiation, so that by comparison with the prior art the use of a finished component and of a glue for adhesion thereof is unnecessary and according to the invention a fundamentally free geometric shape of the structural element can be formed by the material that is liquid when applied. In this case the material forms both the structural element and the glue for fastening it to the lens.

This material is preferably chosen so that it has a sufficiently high adhesive force in combination with the eyeglass lens material, and that after application it only runs slowly or preferably no longer runs at all, and that after application it can cure, preferably in a short time, at least to such an extent that the applied shape no longer changes.

According to the invention the material used may be a polymer that is present as a liquid and that after application is transformed into a solid by light radiation of a suitable wavelength (for example UV light) or a chemical reaction.

In order to prevent the liquid material from running on the lens, the material is irradiated with light for curing directly after the application or even during application. During a chemical reaction used for hardening the reaction, speed can be selected as a function of the application speed so that directly after the application hardening has taken place to such an extent that running is prevented. For this purpose, for example a material consisting of at least two constituents is only mixed in a mixing nozzle immediately locally upstream of the nozzle orifice.

According to preferred embodiment a liquid, in particular a polymer, is used that has the properties of a non-Newtonian fluid, in particular if it behaves in a structurally viscous manner.

In non-Newtonian liquids, in particular structurally viscous liquids, for example polymers, viscosity decrease as the shear rate increases and they can therefore be easily applied, in particular can undergo shaping during application, for example when application takes place through a shape-defining nozzle. During application through the nozzle orifice a high shear rate prevails and the liquid has a comparatively low viscosity. If the shear rate drops after the application, that is to say when the liquid is applied to the eyeglass lens, the viscosity rises again, the fluid is more inherently stable and does not run or only runs slowly, i.e. with a sufficiently high time constant, in order to be cured in the applied shape or at least very close to the applied shape.

According to a possible embodiment of the invention the at least one structural element or each part of a multipart structural element can be produced in a single application step. In such an application step a bead of defined shape or a strand of defined shape of the liquid material can for example be applied and hardened. In this case the shape of the subsequently solidified structural element can be defined for example by the cross-sectional or orifice shape of the nozzle through which the application takes place.

In accordance with another embodiment the at least one structural element or each part of a multipart structural element is produced in a plurality of successive application steps, and in each application step a bead or a strand of the liquid material is applied, possibly with a shape defined by the nozzle. For the structural element or the respective part, such an application constitutes a three-dimensional generative, additive manufacturing process, in which the finished structural element or the part thereof is only completed after the last of a plurality of application steps have been completed and has the shape defined by the arrangement of the beads and/or strands relative to one another.

In this case after each application step the just applied bead or strand is hardened, for example by irradiation or chemical reaction or alternatively a hardening only takes place after all application steps have been concluded, in particular when the hardening preferably takes place by irradiation by light that acts on all the applied beads and/or strands simultaneously.

In principle the strands and/or beads can also be produced with different cross-sections in each application step or at least in a part of the plurality of application steps, and in particular can be positioned relative to one another according to the required shape of the structural element.

In this way structural elements are produced that can be largely freely geometrically defined, in particular when beads of small dimensions are used. Thus a structural element can be assembled generatively and additively in three dimensions for example from a plurality of beads and/or strands of the same or different size. In such a case the beads or strands produced are at least the same shape, possibly except for different cross-sections, so that the shape of the structural element is produced by the relative arrangement of the beads and/or strands with respect to one another on the eyeglass lens.

Due to the variability of shape achieved in this way the method can be converted very quickly under computer control to different eyeglass frame types with the respective structural elements. In this case it is not necessary to change a tool or to change a nozzle.

In contrast to the previously known methods, such as are described in patent DE 100 50 007, the method according to the invention makes it possible to vary the profile cross-section over the circumference of the lens.

For example, one may vary the elasticity of a structural element by changing the cross-sectional shape according to the location, for example in order to achieve the least possible manufacturing precision for the production of the frame and lens edge, with at the same time freedom of movement of the connection.

Furthermore, the method according to the invention enables structural elements for fastening a lens to a frame to be placed only in the regions of the lens edge where they are necessary in order to achieve optimal connection. In this case the positioning and the local cross-sectional shape can be calculated, preferably under computer control, depending upon the shape of the lens cutout in the frame and/or the edge thickness and/or curves of the lens to be inserted, the frame curve as well as the lens and frame material.

Depending upon the eyeglass frame, different structural elements can be produced that enable an optimal connection for the particular case.

The method according to the invention can be employed in order to apply structural elements to eyeglass lenses with different functionalities or objectives to be achieved.

For example, the constructed structural elements designed according to the invention facilitate the formation of fastening structures that serve to connect an eyeglass lens to a frame or also to another eyeglass lens or to fasten them to one another.

Thus with at least one structural element at the edge of an eyeglass lens a facet or other fastening structure can be formed that serves for fastening in the frame.

An example of a structural element connecting two eyeglass lenses is the bridge. Here an individual structural element can be produced by the method according to the invention that simultaneously contacts both eyeglass lenses to be connected.

Another embodiment may provide for the formation of a first structural element on the first eyeglass lens and a second structural element on the second eyeglass lens, and the two structural elements can be fastened to one another or can be connected to one another such that after connecting/fastening they form a bridge. For example, the two structural elements can form a releasable connection, for example a latching or snap-in connection. In the two cases referred to, a structural element forms both a fastening structure and also a support structure that supports the wearing of the eyeglasses by the user.

A further structural element to be designated as a support structure can be produced according to the invention and due to its shape it can form a nose pad by which an eyeglass lens or the entire frame barrel is supported on the nose.

Likewise, according to the invention protective structures can be arranged on an eyeglass lens. For example, it is known that the lens edge of an eyeglass lens of negative diopters can be very sharp and according to the prior art can be provided with a chamfer for preventing injury.

According to the invention a structural element for protection against injuries can be provided on the lens, in particular on an edge of the eyeglass lens, in particular on the edge directed toward the face. Such a protective structure may for example surround the described sharp edge and thus "blunt" it.

Using the example of the widely used frame types of full-rim frame and Nylon frame, possible embodiments of structural elements will be explained and illustrated that serve for fastening between the eyeglass lens and the frame.

BRIEF DESCRIPTION OF THE DRAWING

In the drawings:

FIG. 4 shows a U-shaped structural element with variable height, FIG. 5 shows structural elements on the front and rear face at the edge for formation of clip-in latching connections between the frame and the lens, FIG. 6 shows a structural element for a Nylon frame, FIG. 7 shows structural elements mounted on the edge and extending axially over the front and/or rear face of the lens, for example for clip connections, FIG. 8 shows the application of a plurality of individual strands for the formation of a structural element from the totality of all strands, FIG. 9 shows the application of a plurality of individual beads for the formation of a structural element from the totality of all beads.

SPECIFIC DESCRIPTION OF THE INVENTION

Figure 1:
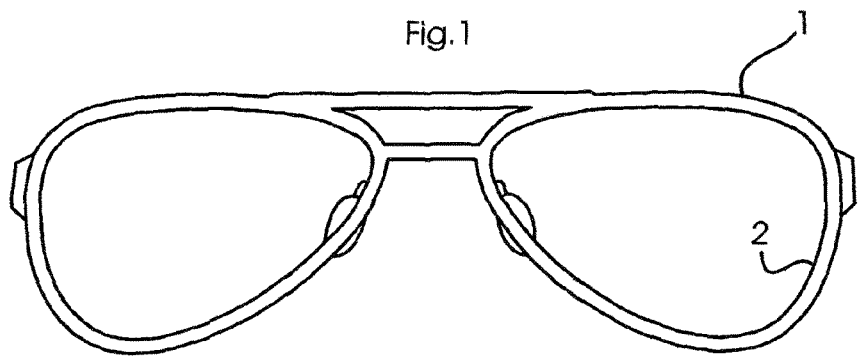
FIG. 1 is a front view of an eyeglass frame.

FIG. 1 shows a full-rim frame 1 that has on the inside of the rim 2 a predetermined shape (not shown here), generally a facet to receive a corresponding shape on an edge 3 of an eyeglass lens 4 of suitable shape.

For such a frame, corresponding structural elements SE, that either correspond to the shape of the frame rim or adapt thereto due to flexibility, are arranged on the edge 3 of an eyeglass lens 4.

Figure 2A:
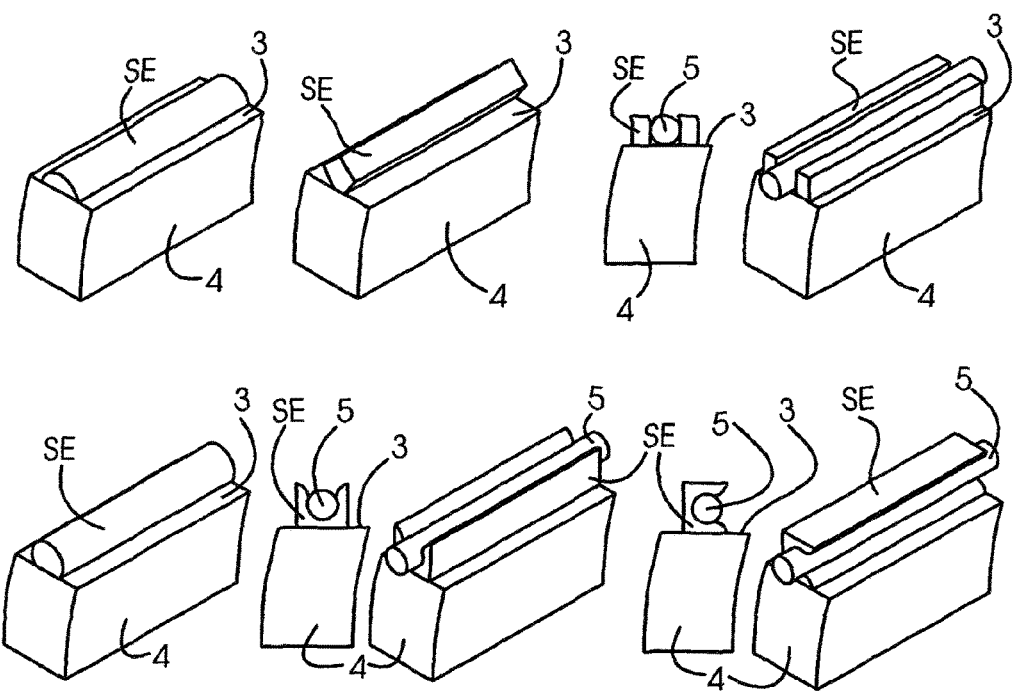
FIGS. 2A and 2B show the shape of a plurality of possible profile cross-sections of structural elements consisting of one or more strands.
Figure 2B:
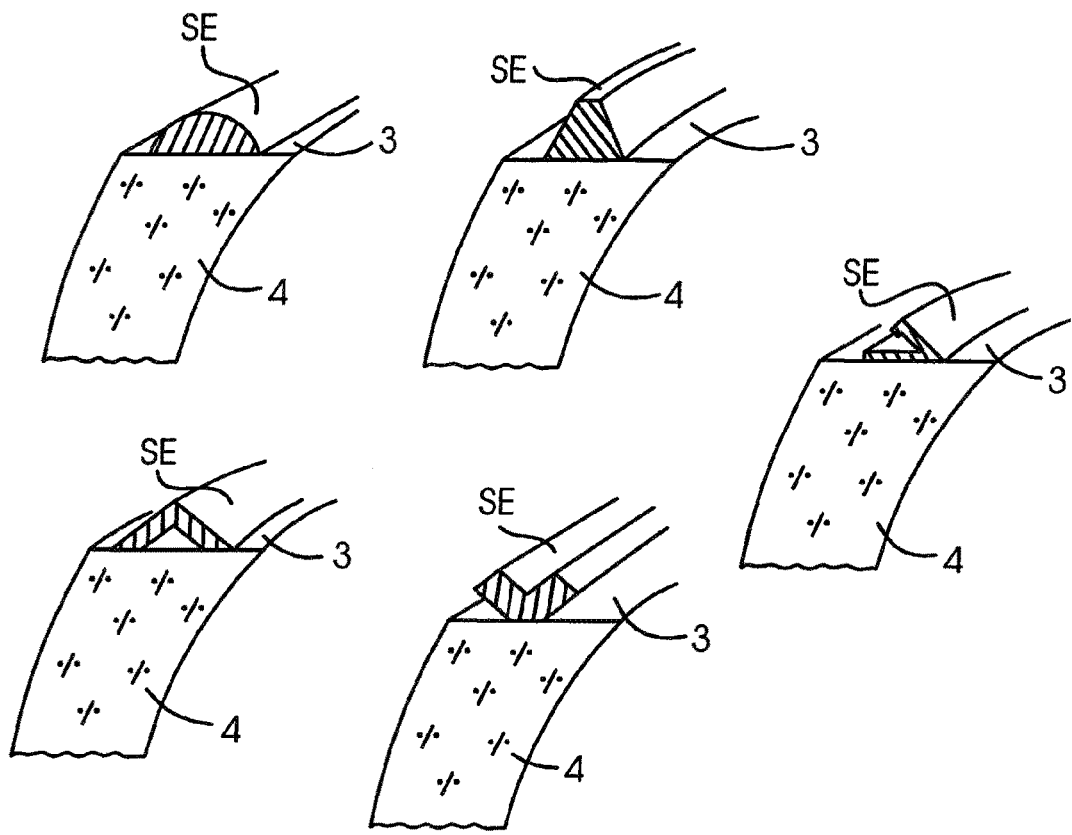

FIGS. 2A and 2B show a large number of possible shapes of structural elements SE that are provided for application to the lens edge 3 of an eyeglass lens 4, as described in the introduction. In this case the forms 1, 2 and 4 of FIG. 2A and the forms of FIG. 2B are suitable for use in a full-rim frame.

The forms 3, 5 and 6 of FIG. 2A show structural elements SE that are provided to receive Nylon filaments 5. For this purpose, they form, on their own or at least in conjunction with the edge, seat grooves into which the filament 5 can be laid.

Figure 3:
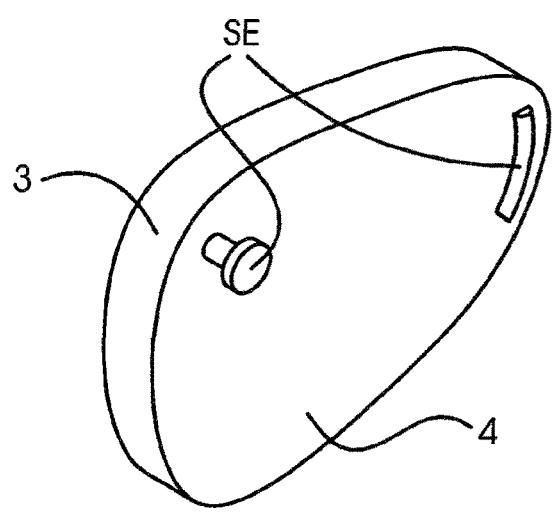
FIG. 3 shows structural elements on the front or rear face for example as a replacement for the holes in the case of rimless frames.

FIG. 3 shows raised structural elements SE on a front face and/or a rear face of an eyeglass lens 4, for example in order to replace rimless frames.

Furthermore, for a full-rim frame for example a structural element SE with a U-shape (perpendicular to the circumferential direction) may be chosen, with for example flexible lips that for example taper radially toward the outside, as shown for example in FIG. 4. This shape is preferably not applied to the entire circumference, but only partially, for example at points that are particularly important for stress-free holding of the lens. Furthermore, due to a preferred variation in the lip height the varying local resilience of the frame rim can be taken into consideration. For example, at straight regions the frame rim is already deflected under slight loading, so that a lower resilience of the structural element SE is advantageous here.

According to FIG. 5 structural elements SE are applied near the edge, project axially (with respect to the optical axis) past the front and/or rear face of the eyeglass lens 4 and serve to form a latching connection between the frame and the lens.

In the case of a Nylon frame, a filament 5 that connects the lens to the frame can be held for example by the embodiment shown in FIG. 6. Here a structural element SE is formed by two parts, specifically two strands that are spaced apart from one another on the lens edge 3. In this case too the structural element SE is preferably applied only partially to the edge 3.

FIG. 7 in turn shows a structural element SE that extends axially beyond the front or rear face, but is fastened completely on the edge 3.

Entirely new possibilities are created by the described method with regard to the connection of the lens and the eyeglass frame by the computer-controlled, precise application of structural elements SE whose shapes can be largely freely defined from a plurality of individual strands or beads.

FIG. 8 shows that a structural element SE is built up from a plurality of individual strands 6, for example substantially circular strands, by a step by step application of the strands on and/or adjacent one another. A structural element that is triangular in cross-section is achieved here by a plurality of strands.

FIG. 9 shows substantially the same cross-sectional shape of the structural element SE, but built up from a plurality of individual beads 7. In this case beads 7 of the same size are arranged in three dimensions and adjacent one another, in order as a whole to form the required structural element SE.

From the large number of possibilities, for example, three further possible embodiments of structural elements SE are described in greater detail without limiting the invention to these possibilities.

One application of the method according to the invention may be the production of structural elements SE on the lens edge 3 or the front or rear face of the lens that are oriented radially, that is to say they extend outward over the lens edge 3 and have a supporting or lens-connecting function.

Figure 10:
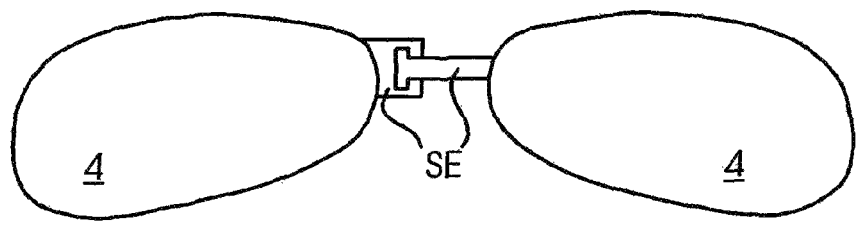
FIG. 10 shows a structural element for forming a bridge.
Figure 11:
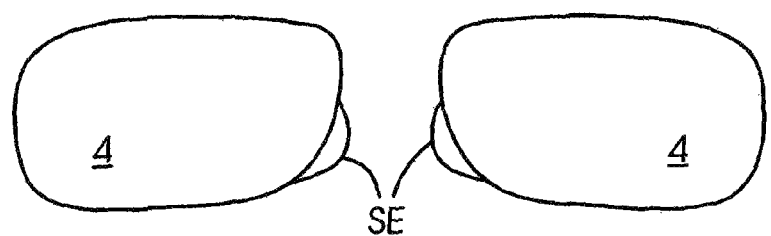
FIG. 11 shows structural elements for forming a nose pad.

FIG. 10 shows a possible embodiment. These structural elements SE can replace parts of an eyeglass frame, in particular a conventional one, or can themselves form eyeglass frame parts and enable new designs. In the illustrated example of FIG. 10 the predominantly radially applied structural elements SE replace the bridge between two lenses or, in FIG. 11, the nose pad.

Figure 12:
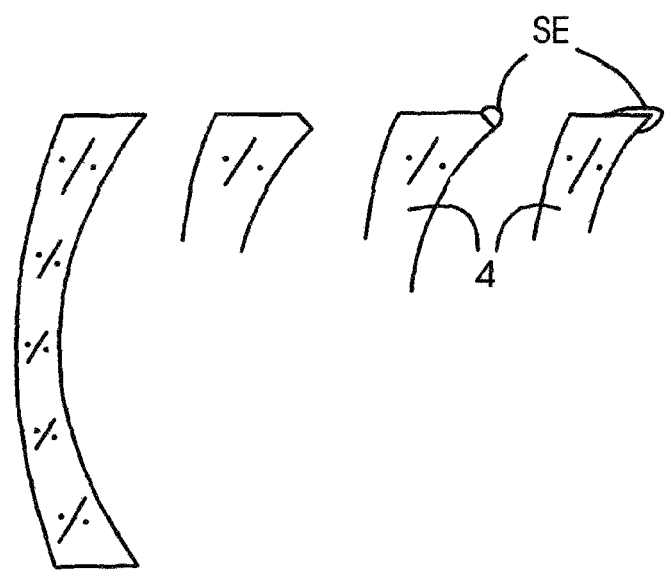
FIG. 12 shows structural elements for protection against injuries.

A further application is the attachment of protective structural elements SE according to FIG. 12 to the rear and/or front edge of the lens. Due to the shape this point on the glass frequently has a very sharp edge that hitherto has been reduced by grinding of a protective facet and thus the danger of injury is reduced. The protective effect can be substantially improved by the application of a structural element SE, for example as an elastic protective coating.

The invention claimed is:

1. A method of making an eyeglass lens with at least one structural element fastened on an edge or on a front or rear face of the eyeglass lens, the method comprising the steps of:
 applying a material in a liquid state to the edge or the front or rear face, and
 bonding the applied material with the lens and hardening the applied material by chemical reaction or by irradiation with electromagnetic waves such that the at least one structural element or each part of a multipart structural element is produced in a single application step in which a plurality of beads of defined shape or a plurality of strands of defined shape of the liquid material are applied adjacent one another or above one another at a rate of one bead or one strand with each application step by a nozzle and hardened, and the shape of the solidified structural element is defined by the cross-sectional or orifice shape of the nozzle or in a plurality of successive application steps, and in each application step a bead or a strand of the liquid material is applied and after each application step the applied bead or strand is hardened.

2. The method according to claim 1, wherein the at least one structural element forms at least one of the following functional elements:
 a structural element that fastens an eyeglass lens to a frame, in particular the frame rim,
 a structural element that connects two eyeglass lenses to one another, and in particular form a bridge,
 a structural element that supports an eyeglass lens or the frame on the nose of a wearer of the eyeglasses, and in particular form a nose pad, or
 a structural element that covers a particularly sharp edge on the edge of an eyeglass lens.

3. The method according to claim 1, wherein the material applied is in particular a polymer with a viscosity dependent upon shear force.

4. The method according to claim 1, wherein the material is a polymer and is hardened by irradiation with UV light.

5. The method according to claim 1, wherein the application of a plurality of beads or strands takes place under computer control as a function of a pre-programmed final shape of a structural element.

6. The method according to claim 1, wherein the cross-sectional shape or the distribution of the structural elements around the eyeglass lens is determined under computer control on the basis of the shape of the lens cutout in the eyeglass frame.

* * * * *